(12) United States Patent
Singh et al.

(10) Patent No.: US 9,439,278 B2
(45) Date of Patent: Sep. 6, 2016

(54) FILM CAPACITOR HAVING A PACKAGE FOR HEAT TRANSFER

(71) Applicant: Deere & Company, Moline, IL (US)

(72) Inventors: Brij N. Singh, West Fargo, ND (US); Thomas Roan, Fargo, ND (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/568,682

(22) Filed: Dec. 12, 2014

(65) Prior Publication Data
US 2016/0174356 A1     Jun. 16, 2016

(51) Int. Cl.
| | | |
|---|---|---|
| H01L 27/108 | (2006.01) |
| H01L 29/94 | (2006.01) |
| H05K 1/02 | (2006.01) |
| H01G 4/32 | (2006.01) |
| H01G 4/236 | (2006.01) |
| H05K 1/18 | (2006.01) |
| H05K 1/11 | (2006.01) |

(52) U.S. Cl.
CPC ............ *H05K 1/0203* (2013.01); *H01G 4/236* (2013.01); *H01G 4/32* (2013.01); *H05K 1/0296* (2013.01); *H05K 1/111* (2013.01); *H05K 1/181* (2013.01); *H05K 2201/10015* (2013.01)

(58) Field of Classification Search
USPC ....................................................... 257/303
See application file for complete search history.

(56) References Cited

U.S. PATENT DOCUMENTS

| | | |
|---|---|---|
| 1,725,123 A | 8/1929 | Bailey |
| 2,948,838 A | 8/1960 | Obenhaus |
| 5,053,916 A | 10/1991 | Weekamp et al. |
| 5,375,035 A | 12/1994 | Stoddard |
| 5,784,248 A | 7/1998 | Tomiyasu et al. |
| 5,973,932 A | 10/1999 | Nguyen |
| 2003/0197198 A1 | 10/2003 | Panella et al. |
| 2004/0066608 A1* | 4/2004 | Takagi ................... H01G 9/012 361/530 |
| 2005/0047060 A1* | 3/2005 | Arai ...................... H01G 9/012 361/312 |
| 2007/0035013 A1* | 2/2007 | Handa ................ H01L 23/5389 257/717 |
| 2009/0103234 A1* | 4/2009 | Oh ........................ H01G 9/012 361/303 |
| 2011/0007452 A1* | 1/2011 | Lin ........................... H01G 2/06 361/541 |
| 2012/0194968 A1* | 8/2012 | Kuromi ................... H01G 9/04 361/528 |
| 2012/0281338 A1* | 11/2012 | Lee ......................... H01G 9/15 361/524 |
| 2013/0100586 A1* | 4/2013 | Kitayama .............. H01G 9/012 361/532 |
| 2013/0182374 A1* | 7/2013 | Mizukoshi .......... H01G 9/0029 361/528 |
| 2014/0166351 A1 | 6/2014 | Lee et al. |
| 2014/0196937 A1 | 7/2014 | Park et al. |

(Continued)

OTHER PUBLICATIONS

The International Search Report and the Written Opinion of the International Searching Authority issued in counterpart application No. PCT/US2015/061846, dated Jan. 28, 2016 (10 pages).

*Primary Examiner* — Asok K Sarkar

(57) ABSTRACT

A capacitor comprises a first winding member, where the first winding member comprises a first dielectric layer and a first conductive layer. A second winding member comprises a second dielectric layer and second conductive layer. The first winding member is interleaved, partially or entirely, with the second winding layer. A dielectric shell or shell is adapted to at least radially contain or border the first winding member and the second winding member. The first winding member is electrically connected to a first conductive end. A second winding member is electrically connected to a second conductive end. The second conductive end is opposite the first conductive end. The first conductive end forms a first lead; the second conductive end forms a second lead.

24 Claims, 9 Drawing Sheets

(56) References Cited

U.S. PATENT DOCUMENTS

2014/0285951 A1* 9/2014 Otani .................... H01G 9/012
                                                          361/528

2014/0313638 A1* 10/2014 Kato ....................... H01G 9/07
                                                          361/524

* cited by examiner

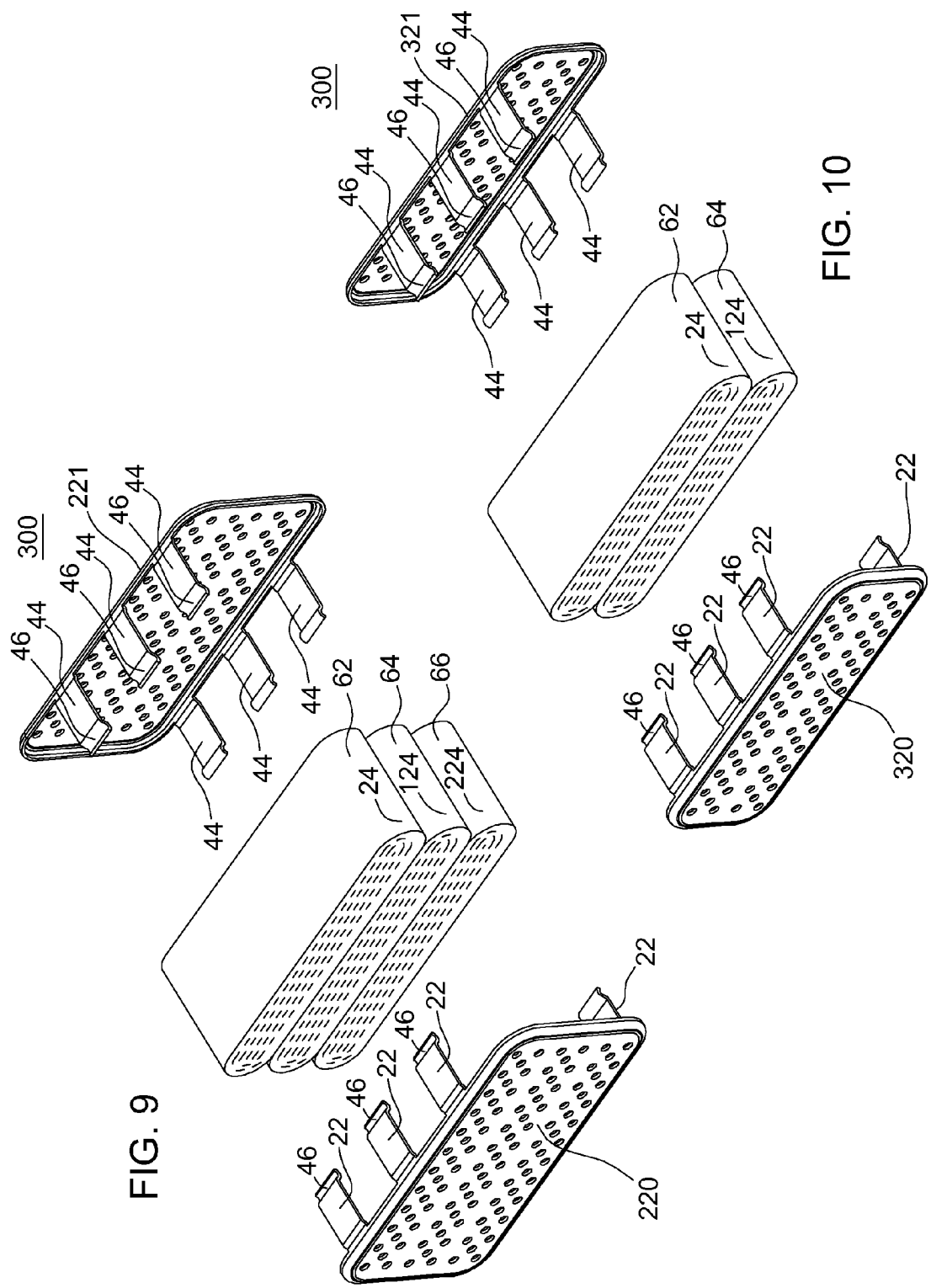

FILM CAPACITOR HAVING A PACKAGE FOR HEAT TRANSFER

FIELD OF THE INVENTION

This disclosure relates to a capacitor having a package for heat transfer and dissipation or an electronic assembly with one or more capacitors having a package for heat dissipation.

BACKGROUND

In certain prior art, a capacitor or an electronic assembly that incorporates one or more capacitors may have inadequate thermal management via heat transfer and dissipation that reduces the longevity or maximum power output of an electronic circuit. In some prior art electrolytic capacitors, the filtering current rating drops significantly at elevated operational temperatures (e.g., both ambient and internal hot-spot temperatures), such as ninety (90) degrees Celsius or greater. In some film capacitors, for a given capacitance the current rating materially declines at elevated operational temperatures. For certain film capacitors, the heat dissipation is limited by the package design of the capacitor, or isolation from humidity. Accordingly, there is need for a capacitor or electronic assembly having package with improved thermal management via heat transfer and dissipation.

SUMMARY

In one embodiment, a capacitor comprises a first winding member, where the first winding member comprises a first dielectric layer and a first conductive layer. The first conductive layer overlies at least a portion of the first dielectric layer. A second winding member comprises a second dielectric layer and second conductive layer. The second conductive layer overlies at least a portion of the second dielectric layer. The first winding member is interleaved, partially or entirely, with the second winding layer. A dielectric shell or shell is adapted to at least radially contain or border the first winding member and the second winding member. The first winding member electrically is connected to a first conductive end. A second winding member is electrically connected to a second conductive end. The second conductive end is opposite the first conductive end. The first conductive end forms a first lead; the second conductive end forms a second lead.

BRIEF DESCRIPTION OF THE DRAWINGS

FIG. 9 shows an exploded perspective view of the capacitor of FIG. 7.

FIG. 10 shows an exploded perspective view of the capacitor of FIG. 8.

Like reference numbers in different drawings indicate like elements.

DETAILED DESCRIPTION

A package of the capacitor 100 comprises one or more leads terminals, or electrodes and an enclosure 24, shell or skin. The package may be configured for optimal or improved heat dissipation of thermal energy from the capacitor 100 to the ambient environment, a circuit board 28 upon which the capacitor 100 is mounted, or an enclosure or housing in which the capacitor 100 and the circuit board are housed, for example. The capacitor 100 may be made or constructed as a film capacitor, or otherwise.

Figure 1:
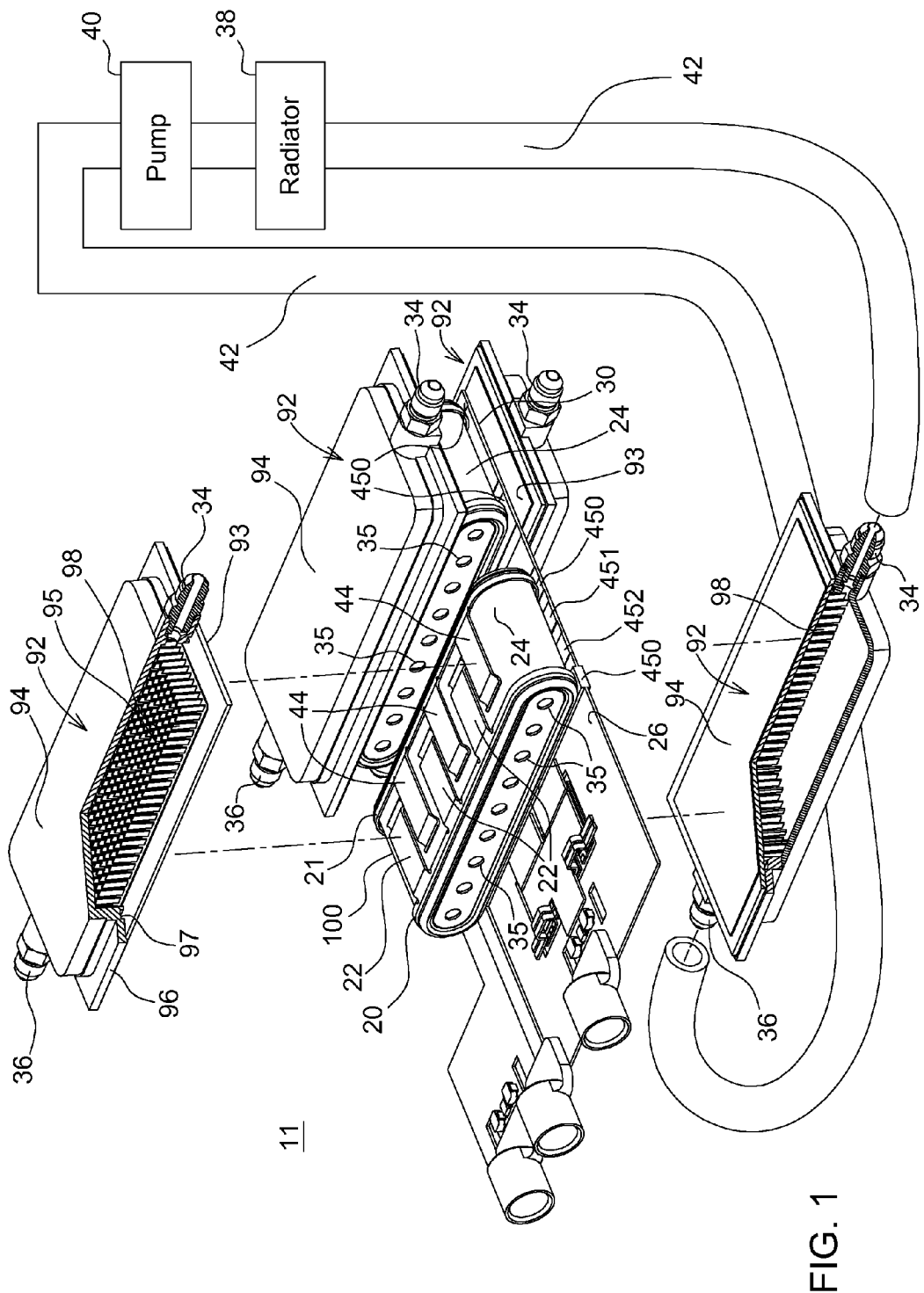
FIG. 1 is a perspective view of one embodiment of an electronic assembly with one or more capacitors, where multiple capacitors are illustratively arranged adjacent to each other and where the capacitors can be cooled by one or more optional heat sink modules.

FIG. 1 illustrates one embodiment of an electronic assembly 11 that comprises a circuit board 28 having one or more conductive traces and one or more capacitors 100 mounted on the circuit board 28. The circuit board 28 has a first side 26 and a second side 30 opposite the first side 26. As shown, the two capacitors 100 are arranged adjacent to each other on a first side 26 of the circuit board 28, but the capacitors 100 may be arranged in other configurations on one or both sides of the circuit board 28.

As used herein the ends (20, 21) and the tabs (22, 44) may be referred to collectively as a lead frame, which can be used for electrical and mechanical connection to one or more metallic or conductive pads or traces of the circuit board 28. Each capacitor 100 disclosed herein can be attached electrically and mechanically to receiving metallic pads (e.g., 450, 451, 452) on the circuit board 28 at ends (20, 21), at tabs (22, 44), or both. For example, the left capacitor 100 may have conductive ends (20, 21) electrically and mechanically connected to (e.g. soldered to) outer receiving metallic pads 450 of the circuit board 28, where each outer receiving pad 450 has an opposite polarity (from the other outer receiving pad 450) that corresponds to proper polarity for conductive end 20 or conductive end 21. A first inner receiving pad 451 may be electrically and mechanically connected (e.g., soldered) to one or more first tabs 22, whereas a second inner receiving pad 452 may be electrically and mechanically connected (e.g., soldered) one or more second tabs 44; where the first inner receiving pad 451 and the second inner receiving pad 452 have opposite polarities. Each of the first tabs 22 is electrically and mechanically connected to a first inner conductive pad 451 on the circuit board 28, and wherein each of the second tabs 44 is electrically and mechanically connected to a second inner conductive pad 452 on the circuit board 28; the first inner conductive pad 451 and the second inner conductive pad 452 forming a thermal pathway for sinking heat into the circuit board 28. In one configuration, the receiving metallic pads (450, 451, 452) comprise conductive pads that are heavy copper pours or metallic pads with greater thickness than other conductive traces on the circuit board 28 for heat dissipation and thermal conduction of heat from one or more capacitors (e.g. 100).

Although not shown, capacitors 100 can also be connected in series at ends (20, 21) via solder or conductive adhesive. In certain embodiments, the capacitors 100 are well-suited for installation or mounting on double-sided circuit boards. The circuit board 28 may be supported by an optional frame (e.g., dielectric or metallic) to offset the circuit board 28 from the housing.

In one embodiment, as shown in FIG. 1, the electronic assembly 11 may support or have one or more optional heat sink modules 92 for active thermal management via a fan or another cooling system. An exterior surface 93 of each heat sink module 92 may overlie or contact one side of a corresponding capacitor 100 (opposite the circuit board 28), such as contacting each capacitor 100 at tabs (22, 44) for the transfer of thermal energy or heat from each capacitor 100 to the respective heat sink module 92. In one embodiment, each optional heat sink module 92 comprises a first portion 94 that mates with a second portion 96 to form an interior 95 (e.g., generally hollow volume) that is populated with thermal dissipation members 98 that are generally spaced apart from each other. As illustrated, a section of the first portion 94 is cut-away for certain heat sink modules 92 illustrated in FIG. 1 to better illustrate the thermal dissipation members 98. The thermal dissipation members 98 may extend inward toward the interior 95 from the first portion 94, the second section 96, or both, or from an intermediate structure sandwiched between the first portion 94 and the second portion 96. The first portion 94 and the second portion 96 can be secured together by fasteners, adhesives, welding, soldering, brazing or otherwise to form a container for holding liquid coolant within the interior 95. In one embodiment, a gasket or seal 97 (e.g., an elastomer) may be placed (e.g., in compression) between the first portion 94 and the second portion 96 to retain the liquid coolant within the interior and to prevent leakage to an exterior of the heat sink module 92. In one configuration, the thermal dissipation members 98 may comprise rows and columns of pins or projections that are spaced apart to allow coolant fluid to flow between them, or elsewhere within the interior of the heat sink module 92.

Each heat sink module 92 may have one or more coolant ports (34, 36), such as an inlet port and an outlet port, for connection to or communication with the hollow volume or interior of the heat sink module 92. The coolant ports (34, 36) facilitate connection of the coolant passages with one or more of the following: lines 42, tubing, conduit, pipes, fittings, a radiator 38, or a pump 40 for circulating or conveying a coolant or a fluid. Heat from the capacitors 100 is conducted to or transferred from the ends (20, 21) to the tabs (22, 24), from the tabs (22, 24) to an exterior surface 93 of the heat sink module 92, from the exterior surface 93 of the heat sink module 92 to the thermal dissipation members 98 and from the thermal dissipation members to the coolant that is circulated to the radiator for transfer or removal of the thermal energy to the ambient environment. Finally, the heat is dissipated at the radiator 38 as a pump 40 circulates or conveys the coolant between the lines 42 and the radiator 38. The capacitors 100 may be adapted for active thermal management on one or both sides (26, 30) of the circuit board 28 to maintain a target capacitance value (e.g., microFarad value) and current ratings (e.g., amperage value) for a particular power electronics, inverter or motor controller application.

In one alternate embodiment, an alternate heat sink module may comprise a series of coolant channels or one or more circuitous coolant channels within an interior of the heat sink module instead of the thermal dissipation members 98 of heat sink module 92.

In another alternate embodiment, an alternate heat sink module may represent a passive heat sink such as a heat sink with one or more radiating fins or members that project into the ambient air for dissipating heat. Passive heat dissipation does not use pumped or circulated fluid or a fan propulsion mechanism.

In one configuration, each capacitor 100 and its lead frame supports dual-sided thermal management. With respect to thermal management of the first side of the capacitor 100, the capacitor lead frame attachment to the conductive pads offers great flexibility in thermal management by supporting various degrees of heat sinking into the circuit board 28. For example, lead frame of the capacitors 100 disclosed herein can be attached electrically and mechanically connected to traces or conductive pads on the circuit boards at ends (20, 21), or at tabs (22, 44), or both, where each mechanical connection to the conductive pads provides thermal path to conduct, potentially, heat away from the capacitor. With respect to thermal management of the second side, opposite the circuit board 28, an optional respective thermal heat sink 92 may overlie the capacitor 100 for heat sinking.

Figure 2:
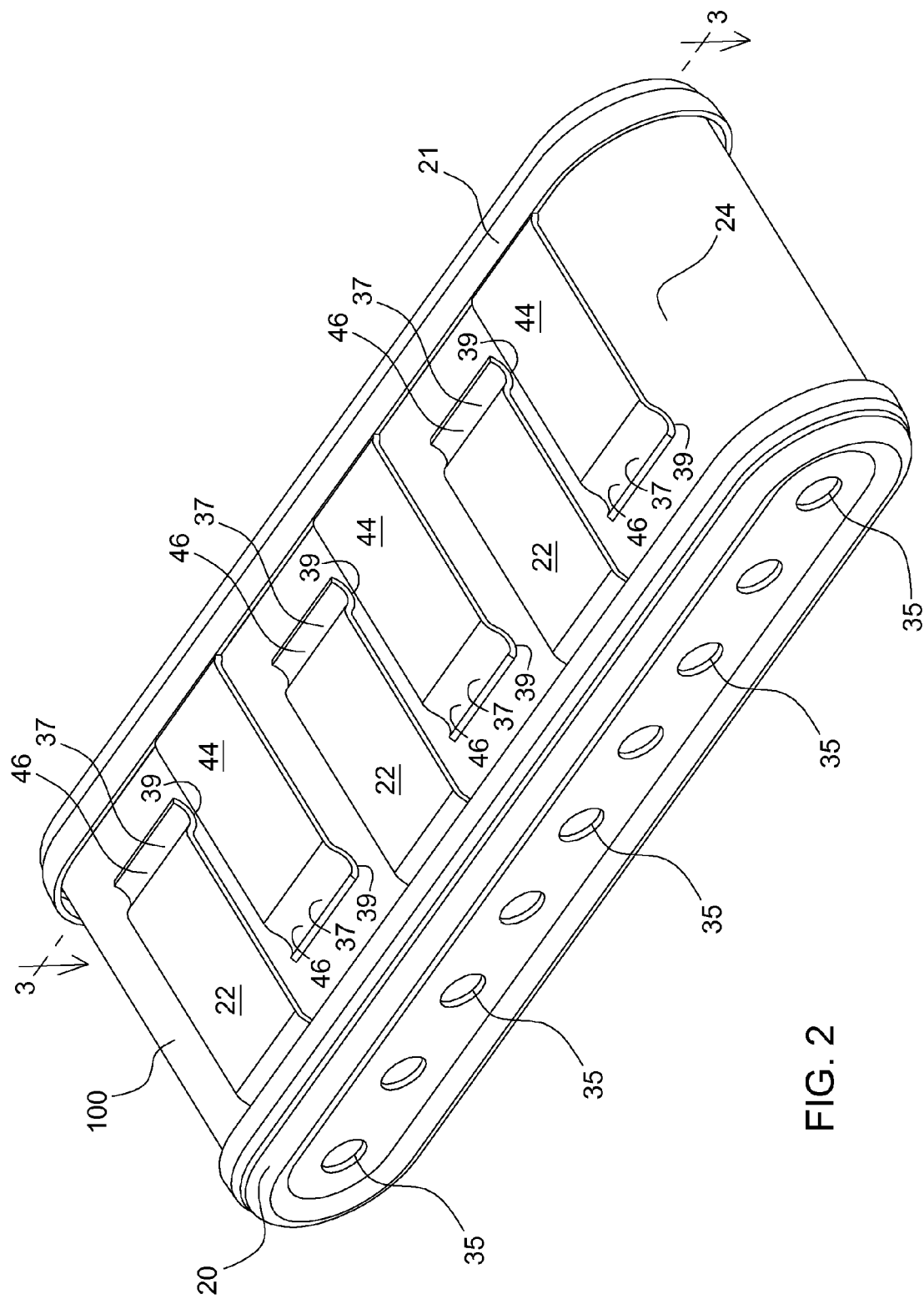
FIG. 2 is a perspective view of single capacitor of FIG. 1.
Figure 3:
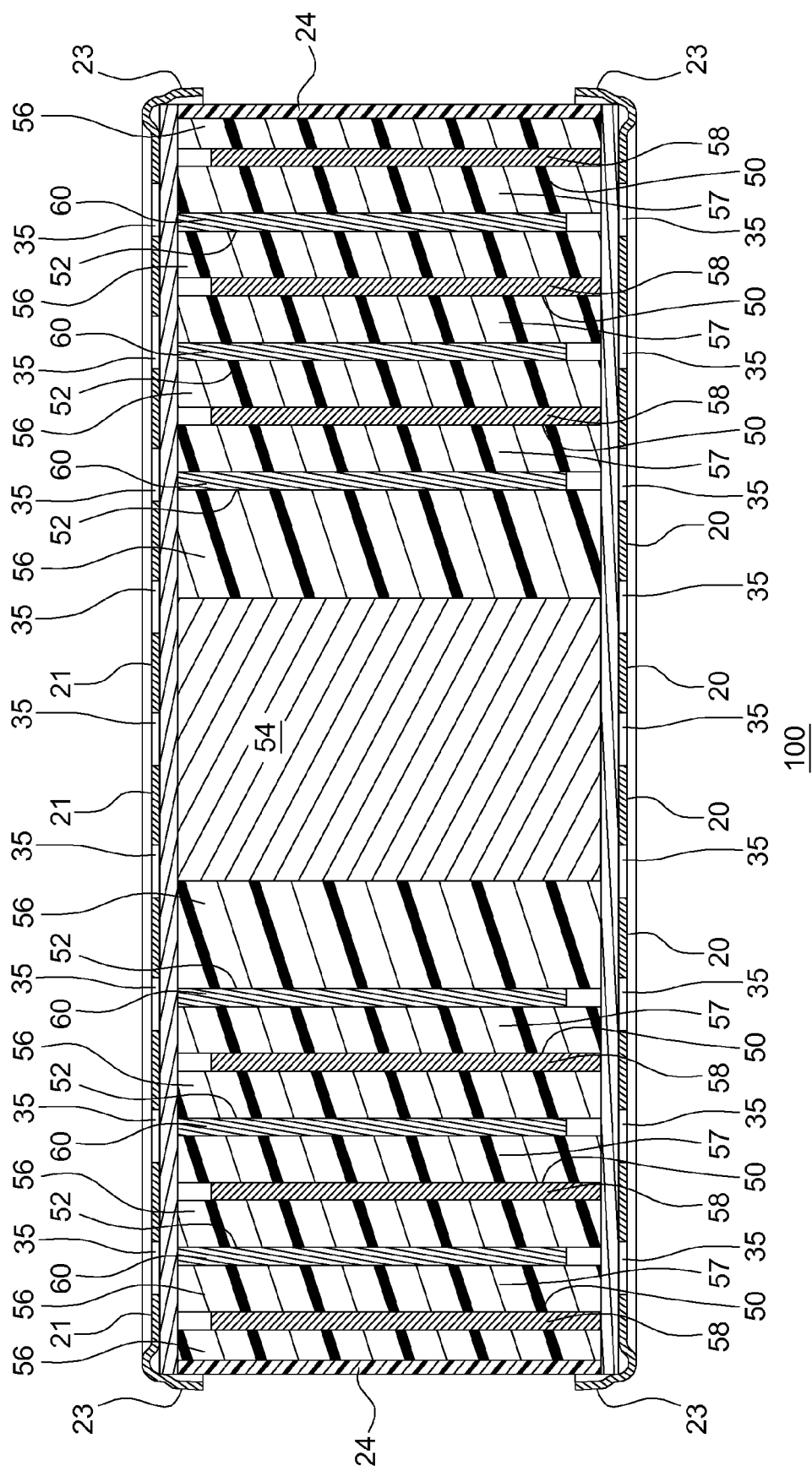
FIG. 3 shows a cross-section of the capacitor of FIG. 2 along reference line 3-3 of FIG. 2.
Figure 4:
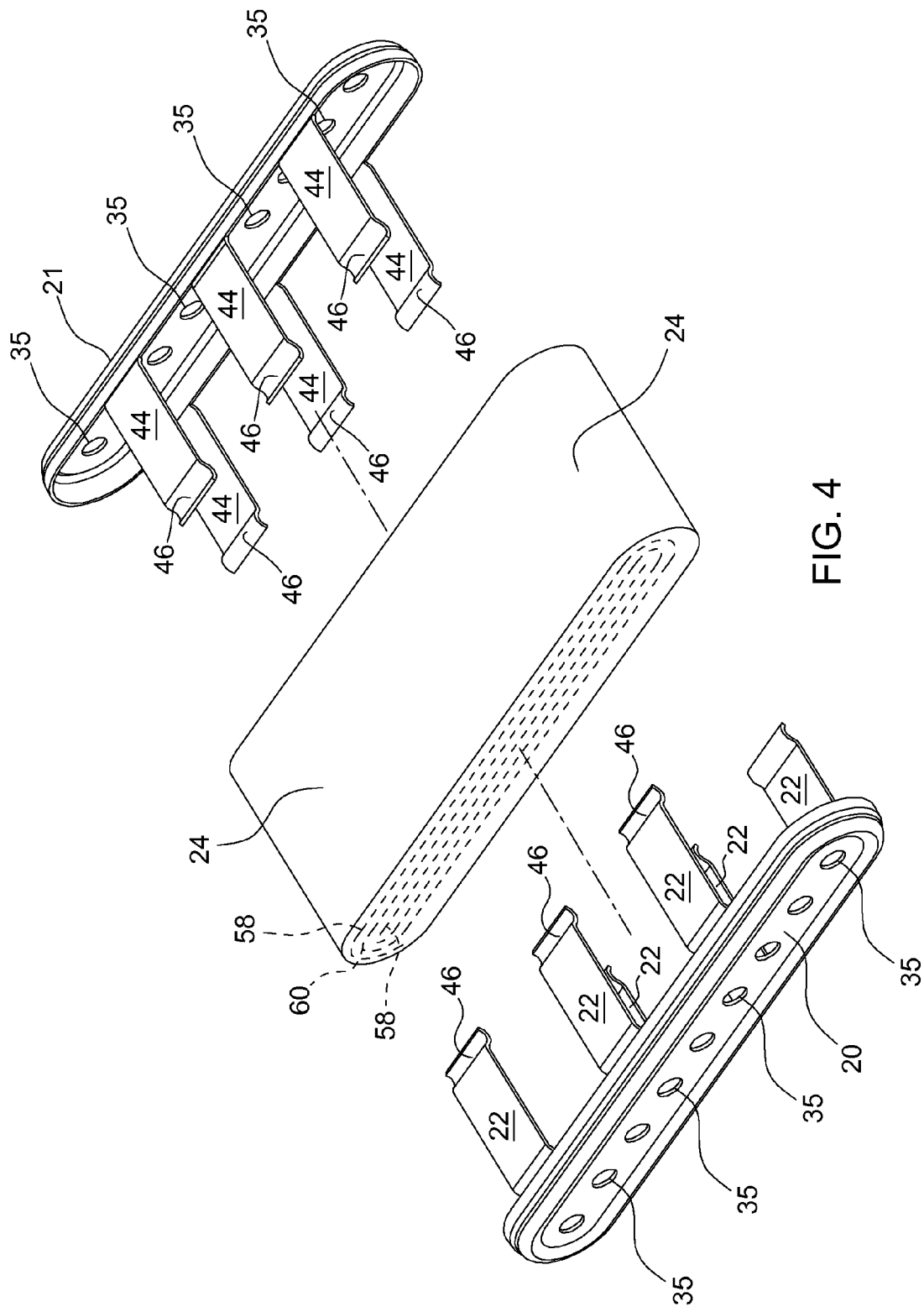
FIG. 4 shows an exploded perspective view of the capacitor of FIG. 2.

As illustrated in FIG. 2, FIG. 3 and FIG. 4, in one embodiment a capacitor 100 comprises a first winding member 58 and a second winding member 60. The first winding member 58 is interleaved, partially or entirely, with the second winding layer 60. In one embodiment, the first winding member 58 comprises a first dielectric layer 56 and a first conductive layer 50. The first conductive layer 50 overlies at least a majority portion of the first dielectric layer 56. A second winding member comprises a second dielectric layer and second conductive layer 52. The second conductive layer 52 overlies at least a majority portion of the second dielectric layer 57.

A dielectric shell 24 is adapted to at least radially contain or border the first winding member 58 and the second winding member 60. A dielectric shell 24 contains radially or borders radially the first winding member 58 and the second winding member 60. The dielectric shell 24 may comprise a dielectric skin or dielectric shell 24, for example.

The first winding member 58 electrically is connected to a first conductive end 20. A second winding member 60 is electrically connected to a second conductive end 21. The second conductive end 21 is opposite the first conductive end 20. The first conductive end 20 forms a first lead; the second conductive end 21 forms a second lead.

In one configuration, the first dielectric layer 56 and the second dielectric layer 57 are formed of polyethylene, a plastic, or polymer that is substantially elastically deformable or generally pliable. The first conductive layer 50 and the second conductive layer 52 can be a metal foil layer or a metallized layer that is formed by electro-less deposition, sputtering, plating or other process. The first winding member 58 has a side margin of the first dielectric layer 56 that is not metallized or covered by a first conductive layer 50; the second winding member 60 has a side margin that is not metallized or covered by a second conductive layer 52, where the first winding member 58 and the second winding member 60 are stacked on top of each other and wound around dielectric bobbin 54 or form (e.g., a removable or captive form).

The first conductive end 20 and the second conductive end 21 may comprise a metal cap, cup, top, or lid. In one embodiment, the first conductive end 20 has a peripheral mounting lip 23 that extends inward toward (and to engage) the dielectric shell 24 and wherein the second conductive end 21 has a peripheral lip 23 (e.g., peripheral mounting lip)

that extends inward toward (and to engage) the dielectric shell 24. The peripheral lip 23 may be biased or spring loaded with an indentation to form an interconnection with the first winding set, which includes the first winding member 58 and the second winding member 60 collectively, or the peripheral lip 23 and the conductive end (20, 21) may be secured to the first winding set via a sealant adhesive or otherwise. After the electrical and mechanical connection between the conductive end (20, 21) and conductive layers (50, 52) is made via solder or conductive adhesive, the remaining air gap or spatial volume between any conductive end and the first winding set, which is the first winding member 58 and the second winding member 60 collectively, may be filled with a sealant, a polymer, a plastic, an elastomer, an adhesive or other suitable material (e.g. a thin layer of such material) to provide for environmental management, such as resistance to moisture, salt, fog, humidity. For example, the above air gap or spatial volume can be filled with Dow-Corning sealant 3-6121 which is available from Dow Corning or pre-form resin insert or glue (e.g., gel) available from Resin Designs, LLC of Woburn, Mass. The sealant, elastomer, adhesive, or other material can either eliminate or significantly minimize the volume of, quantity of, or need for any resin, filler, polymer, or plastic that is conventionally used for manufacture of packages of film capacitors 100.

Figure 5:
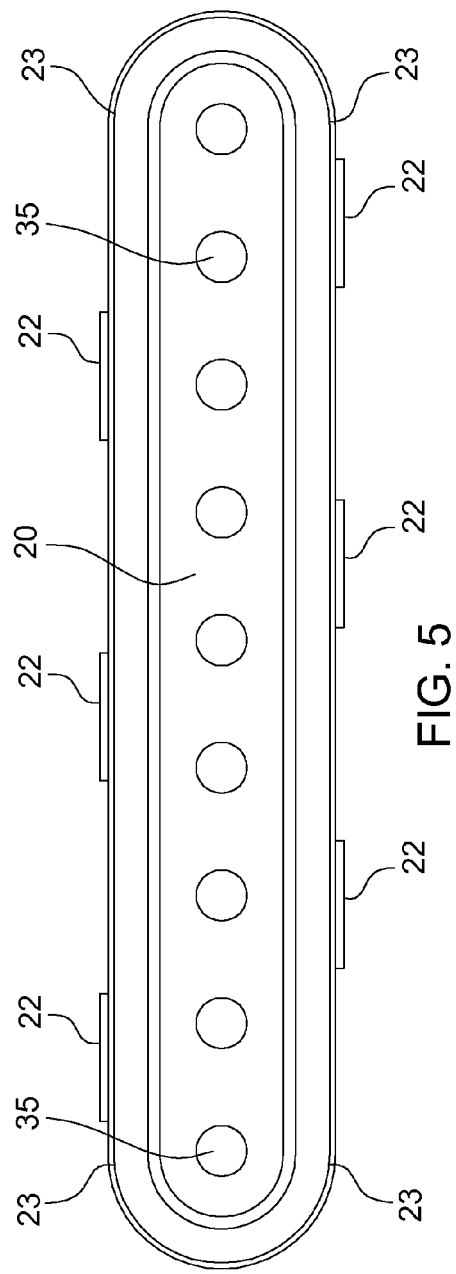
FIG. 5 illustrates one embodiment of an end of a capacitor of FIG. 2.

As illustrated in FIG. 4 and FIG. 5, the first conductive end 20 has plurality of axially extending holes 35 and wherein the second conductive end 21 has a plurality of axial extending holes 35. The holes 35 are well suited for accepting solder, solder balls, or conductive adhesive for mechanical and electrical connection of the first conductive layer 50 to a corresponding conductive end (e.g., 20) and the second conductive layer 52 to a corresponding conductive end (e.g., 21). Each capacitor (e.g., 100) can be constructed (economically and efficiently) by running the capacitor components through a wave-soldering process to connect the first conductive layer 50 to a corresponding conductive end (e.g., 20) and the second conductive layer 52 to a corresponding conductive end (e.g., 21) via the holes, depressions or dimples (e.g., 35) that allow solder to flow into a electrical terminal well or electrical terminal gap region in the interior of the capacitor. Accordingly, each capacitor (e.g., 100) can be constructed (economically and efficiently) by using solder or conductive adhesive to connect the first conductive layer 50 to a corresponding conductive end (e.g., 20) and the second conductive layer 52 to a corresponding conductive end (e.g., 21) without the use of costly metal foil or nano-foil to make electrical and mechanical connections. Further, the holes 35 can facilitate connection of one or more capacitors 100 in an end for end configuration. For example, the holes 35 may improve adhesion of the solder or solder balls to the conductive ends. The holes 35 can also facilitate heat dissipation from the conductive ends by increasing exposure or surface area exposed to the ambient air where all holes 35 need to be substantially filled, injected, back-filled, dabbed, dipped, coated, covered or encapsulated with suitable material to prevent ingress of moisture or humidity. For example, such suitable materials filling, injecting, back-filling, dabbing, dipping, coating, covering or encapsulating the holes 35 may include one or more of the following: solder, solder balls, braze, conductive adhesive, elastomer, polymer, or plastic.

Figure 6:
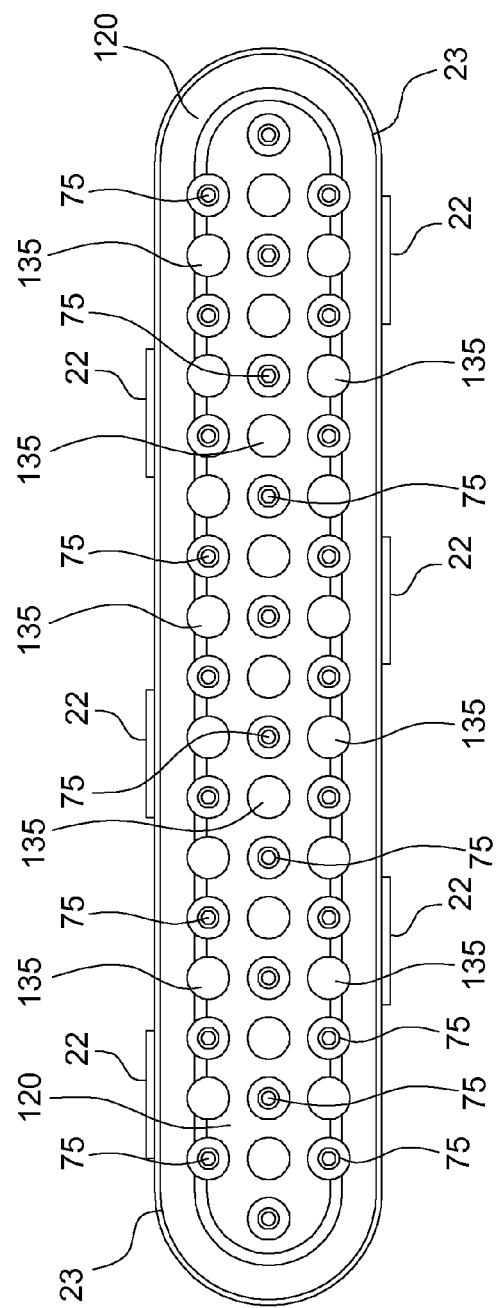
FIG. 6 illustrates another embodiment of an end of a capacitor.

In an alternative embodiment, the holes 35 may be replaced by depressions (e.g., 75), substantially hemispherical depressions, substantially cylindrical depressions, or pitted regions for improving adhesion of the solder or solder balls to the conductive ends, as illustrated in FIG. 6 which is described later.

In one embodiment, first tabs 22 extend at a substantially orthogonal angle from the first conductive end 20 (e.g. an end surface inward from the peripheral lip 23) and the second tabs 44 extend at a substantially orthogonal angle from the second conductive end 21 (e.g. an end surface inward from the peripheral lip 23). The first tabs 22 and the second tabs 44 may comprise metallic fingers, for example. In one configuration, the first tabs 22 are interleaved with or adjacent to second tabs 44. As shown, each of the first tabs 22 and the second tabs 44 terminates in a retainer 46, such as an arched portion, wherein the retainer 46 or arched portion is biased against the dielectric shell 24 (e.g., to retain the conductive ends (20, 21) to the shell 24 or enclosure), although other configurations are possible and fall within the scope of the disclosure. To facilitate the bias against the shell 24, in one embodiment a greater radius 39 of the arched portion faces inward toward the dielectric shell 24 and a lesser radius 37 of the arched portion faces outward.

In an alternate embodiment, the first tab, the second tab, or both may comprise a substantially U-shaped conductive member that contacts opposite sides of the dielectric shell 24 and that contacts one conductive end. In another alternative embodiment, the first tab, the second tab or both may comprise a three-sided channel or three sided bracket with two substantially orthogonal corners.

FIG. 6 illustrates another embodiment of an end of a capacitor in which some holes 135 (or other perforations) and some depressions 75 (e.g., substantially hemispherical depressions or substantially cylindrical depressions), for example. The number of holes 135 or perforations in FIG. 6 may be greater than the number of holes 35 or perforations illustrated in FIG. 5, for example. The holes 135 of FIG. 6 in each conductive end (e.g., conductive end 120) are similar to holes 35 of FIG. 2 in the conductive ends (20, 21), but differ in the size, number, orientation or pattern. The conductive ends (120, 121) are associated with peripheral lips 23 and tabs 22, where like reference numbers indicate like elements in the drawings. The depressions 75 are capable of receiving solder to attach capacitors to each other on end for end basis, or to attach one or more conductive ends to conductive traces, or other conductors (e.g., conductive buses) associated with a circuit board 28.

Figure 7:
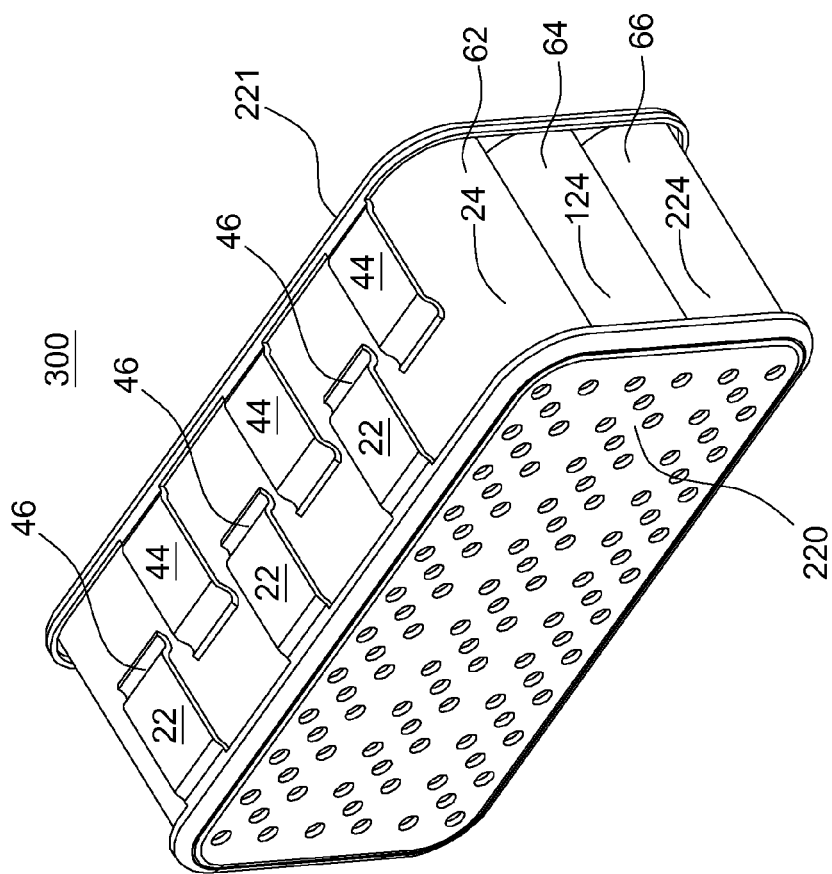
FIG. 7 shows a perspective view of another embodiment of a capacitor.

FIG. 7 shows a perspective view of another embodiment of a capacitor 200. The capacitor 200 of FIG. 7 is similar to the capacitor 100 of FIG. 2, except the capacitor 200 of FIG. 7 has three winding sets (62, 64, 66) while the capacitor of FIG. 2 only has one winding set (e.g., 62), such as a winding set formed from the first winding member 58 and the second winding member 60. Further, in FIG. 7 the first conductive end 220 and the second conductive end 221 have a size and shape adapted to receive three winding sets (62, 64, 66), instead of one winding sets in FIG. 2. Like reference numbers in FIG. 2 and FIG. 7 indicate like elements.

As illustrated in FIG. 7 and FIG. 9, collectively, a first winding set 62 comprises the first winding and the second winding; a second winding set 64 comprises a third winding and the fourth winding, and a third winding set 66 comprises a fifth winding and a sixth winding. In certain embodiments, first winding, the second winding, the third winding, the forth winding, the fifth winding and the sixth winding may be virtually identical to increase the volume of similar parts for manufacturing efficiencies for different value of capacitance. The total capacitance of the capacitor 200 of FIG. 7 may be based on the sum of parallel capacitances associated with each winding. For example, the total capacitance of the capacitor 200 of FIG. 7 may be determined in accordance with the following equation.

$C_T = C_1 + C_2 + C_3$, where $C_T$ is the total capacitance, $C_1$ is a first capacitance associated with the first winding set 62, $C_2$ is the second capacitance associated with the second winding set 64, and $C_3$ is the third capacitance associated with the third winding set 66.

The primary dielectric shell 24 radially surrounds the first winding and the second winding, or collectively the first winding set 62. A secondary dielectric shell 124 radially surrounds the third winding member and the fourth winding member, or collectively the second winding set 64. A tertiary dielectric shell 224 radially surrounds the fifth winding member and the sixth winding member, or collectively the third winding set 66.

None or minimal dielectric filler, adhesive, polymer, plastic, elastomer or resin is required between or around the primary dielectric shell 24 and the secondary dielectric shell 124, although such filler, sealant, adhesive, polymer, plastic, elastomer or resin can be used (e.g., in the air gap between the conductive ends (220, 221) and any winding set (62, 64, 66) to provide further environmental isolation of the winding sets (or the electrical interface between the winding set (62, 64, 66) and the conductive ends (220, 221)) from moisture, humidity, salt or fog, or to provide a target shape, size or mounting footprint for the package of the capacitor 200. None or minimal dielectric filler, adhesive, polymer, plastic, elastomer or resin is required between or around the secondary dielectric shell 124 and the tertiary dielectric shell 224, although such filler, sealant, adhesive, polymer, plastic, elastomer or resin can be used (e.g., in the air gap between the conductive ends (220, 221) and any winding set (62, 64, 66) to provide further environmental isolation of the winding sets (or the electrical interface between the winding set (62, 64, 66) and the conductive ends (220, 221)) from moisture, humidity, salt or fog, or to provide a target shape, size or mounting footprint for the package of the capacitor 200. None or minimal dielectric filler, adhesive, polymer, plastic, elastomer or resin is required between or around any combination or permutation of the primary dielectric shell 24, the secondary dielectric shell 124, and the tertiary dielectric shell 224, although such filler, sealant, adhesive, polymer, plastic, elastomer or resin can be used to provide further environmental isolation of the winding sets (e.g., in the air gap between the conductive ends and any winding set) or the electrical interface between the winding set and the conductive ends from moisture, humidity, salt or fog, or to provide a target shape, size or mounting footprint for the package of the capacitor.

Figure 8:
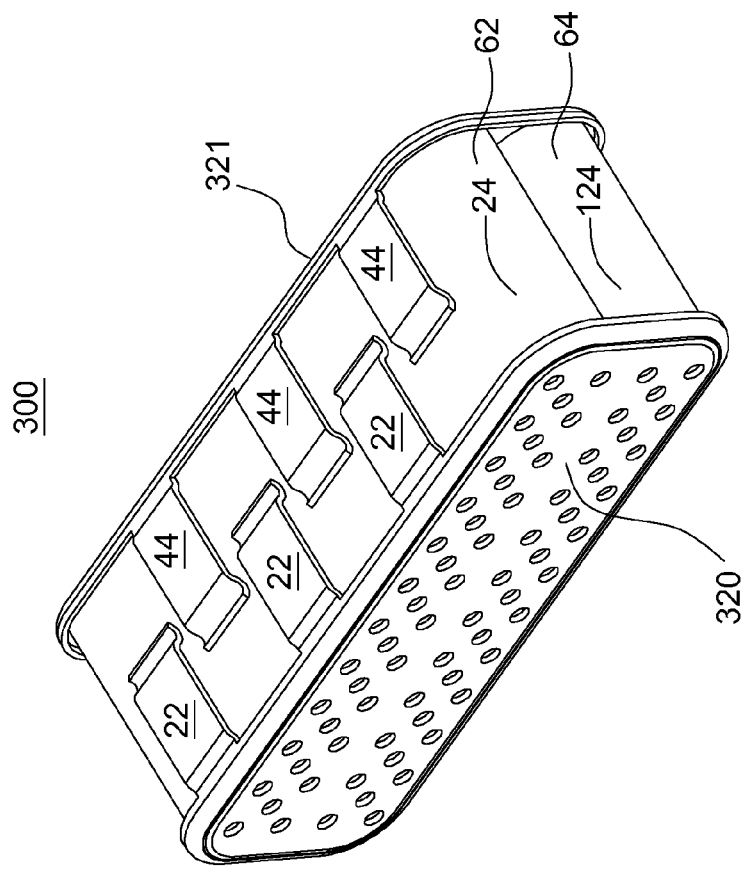
FIG. 8 shows a perspective view of yet another embodiment of a capacitor.

FIG. 8 shows a perspective view of yet another embodiment of a capacitor 300. The capacitor 300 of FIG. 8 is similar to the capacitor 100 of FIG. 2, except the capacitor 300 of FIG. 8 has two winding sets (62, 64) while the capacitor 100 of FIG. 2 only has one winding set, such as a winding set formed from the first winding member 58 and the second winding member 60. Further, in FIG. 8 the first conductive end 320 and the second conductive end 321 have a size and shape adapted to receive two winding sets (62, 64), instead of one winding sets in FIG. 2. Like reference numbers in FIG. 2 and FIG. 8 indicate like elements.

For example, the total capacitance of the capacitor 300 of FIG. 8 may be determined in accordance with the following equation.

$C_T = C_1 + C_2$, where $C_T$ is the total capacitance, $C_1$ is a first capacitance associated with the first winding set 62, $C_2$ is the second capacitance associated with the second winding set 64.

As illustrated in FIG. 8 and FIG. 10, collectively, a first winding set 62 comprises the first winding member 58 and the second winding member 60; a second winding set 64 comprises a third winding member and the fourth winding member. A primary dielectric shell 24 radially surrounds the first winding and the second winding, or collectively the first winding set 62. A secondary dielectric shell 124 radially surrounds the third winding member and the fourth winding member, or collectively the second winding set 64. None or minimal dielectric filler, adhesive, polymer, plastic, elastomer or resin is required between or around the primary dielectric shell 24 and the secondary dielectric shell 124, although such filler, sealant, adhesive, polymer, plastic, elastomer or resin can be used (e.g., in the air gap between the conductive ends (220, 221) and any winding set (62, 64, 66) to provide further environmental isolation of the winding sets (or the electrical interface between the winding set (62, 64, 66) and the conductive ends (220, 221)) from moisture, humidity, salt or fog, or to provide a target shape, size or mounting footprint for the package of the capacitor 200.

Figure 11:
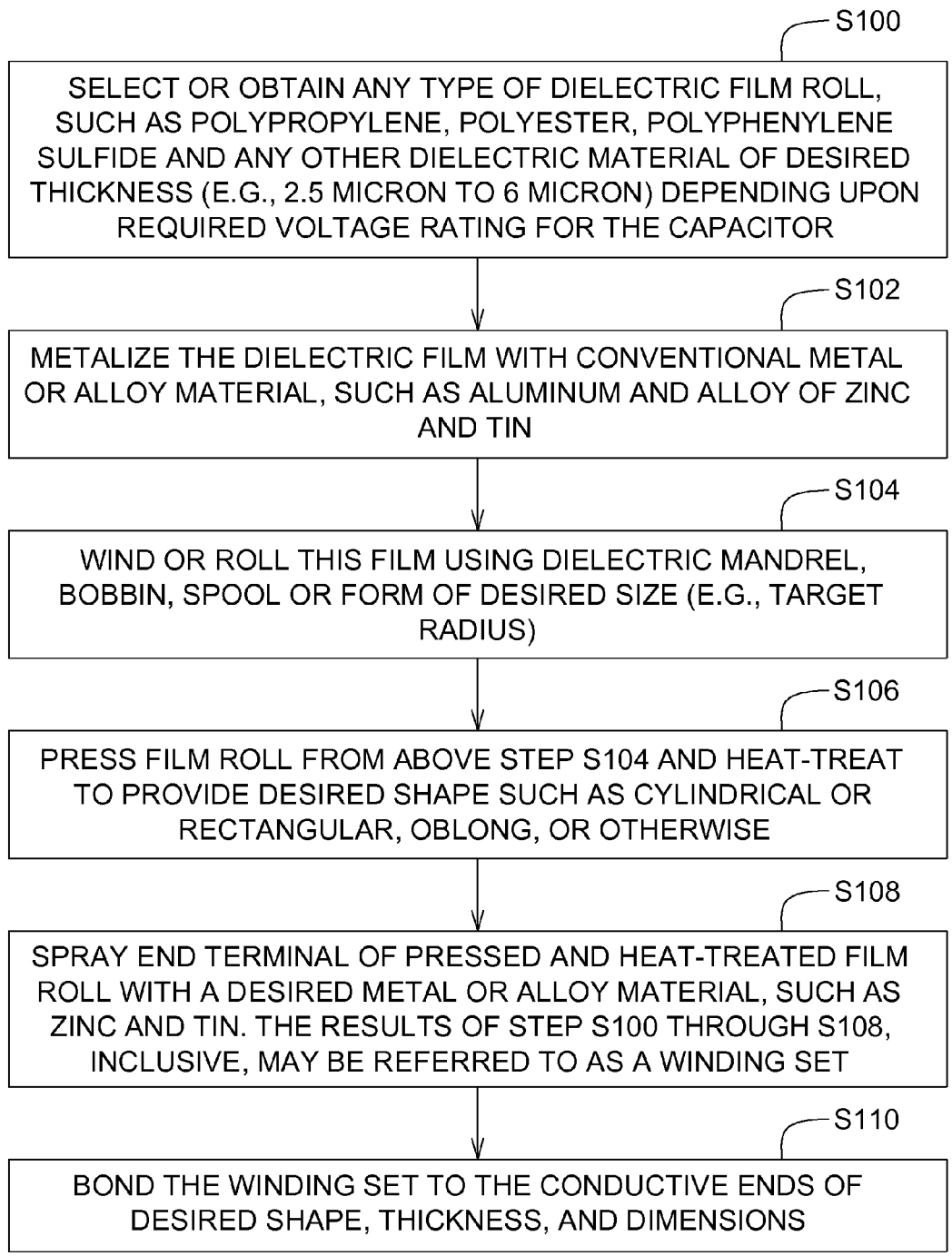
FIG. 11 illustrates one embodiment of a method of manufacturing the capacitor of the disclosure, such as the capacitor of FIG. 2.

FIG. 11 illustrates one embodiment of a method of manufacturing the capacitor of the disclosure, such as the capacitor of FIG. 2. The method takes raw film capacitor elements from manufacturer and rest of packaging and sealing (desired minimum process) is done at secondary manufacturer. A film capacitor that has gone through certain steps in manufacturing process is defined as raw film element, or first winding set 62, second winding set 64 or third winding set 66. Some manufacturer of the raw element may also call it naked element. Therefore, the name of raw element could vary, however, the basic concept remains same. Steps used for manufacturing process are stated as below;

In step S100, select or obtain any type of dielectric film roll such as polypropylene, polyester, polyphenylene sulfide (PPS), and any other dielectric material of desired thickness (e.g., 2.5 micron to 6 micron) depending upon required voltage rating for the capacitor. In turn, the voltage rating for the capacitor may depend upon the rated voltage of inverter DC bus or for another electrical network or circuit application of the capacitor.

In step S102, metalize the dielectric film with conventional metal or an alloy material, such as aluminum and/or an alloy of Zinc and Tin. For example, the film can be metallized by controlled process of sputtering or spraying of molten metal.

In step S104, wind or roll this film using dielectric mandrel, bobbin, spool or form of desired size (e.g., target radius).

In step S106, press film roll from above step S104 and heat-treat to provide desired shape such as cylindrical or rectangular, oblong, or otherwise.

In step S108, spray end terminals of pressed and heat-treated film roll with a desired metal (e.g., aluminum) and/or an alloy material, such as Zinc and Tin. For example, a desired metal or alloy material may reduce corrosion of the metalized layer on the dielectric film.

The results of step S100 through S108, inclusive, may be referred to as raw film element or naked element or winding set (62, 64, 66).

In step S110, the winding set (62, 64, 66) or raw film elements are bonded to the conductive ends (20, 21, 120, 220, 221, 320, 321) of desired shape, thickness, and dimensions. In one configuration, each conductive ends (20, 21, 120, 220, 221, 320, 321) comprises a flexible lead frame of desired shape, thickness, and dimensions. Step S110 may be carried out by one or more of the following techniques, which may be applied alternately or cumulatively to bond the conductive ends (20, 21, 120, 220, 221, 320, 321) to the windings or winding sets (62, 64, 66).

Under a first technique, the bonding is accomplished by exothermic reaction in a nano-foil sandwiched between sprayed end terminals of raw element and conductive ends. Exothermic reaction in nano-foil causes nano-foil temperature to go as high as 1500 degrees Celsius for nano-seconds to micro-seconds duration. Therefore, at the transient elevated temperature, the nano-foil melts without any reflow and thus two-surfaces (winding or winding set and conductive ends) are bonded together with the desired strength needed for electrical, mechanical and thermal properties and performance. Nano-foil bonding method needs about 15 pounds per square inch (PSI) to 30 PSI pressure between two metallic surfaces used for bonding Under a second technique for executing step S110, the bonding between the is accomplished by selective wave soldering to fill in desired number of dimples/depressions or holes (e.g., holes 35) in the conductive ends (20, 21, 120, 220, 221, 320, 321) or the lead frames while lead frames are pressed against, or held in position with respect to, raw film capacitor element ends or end terminal regions (e.g., where a cross section of the first conductive layer 50, the second conductive layer 52, or the metal foil is exposed).

Under a third technique for executing step S110, the bonding is accomplished by a pre-formed solder sheet sandwiched between raw element and lead frame and then placed over hot-plate and pressed down to exploit advantage of low melting temperature of pre-form solder sheet.

Under a fourth technique for executing step S110, the bonding is accomplished by resistive soldering method to bond lead frames with the raw film capacitor element.

Figure 12:
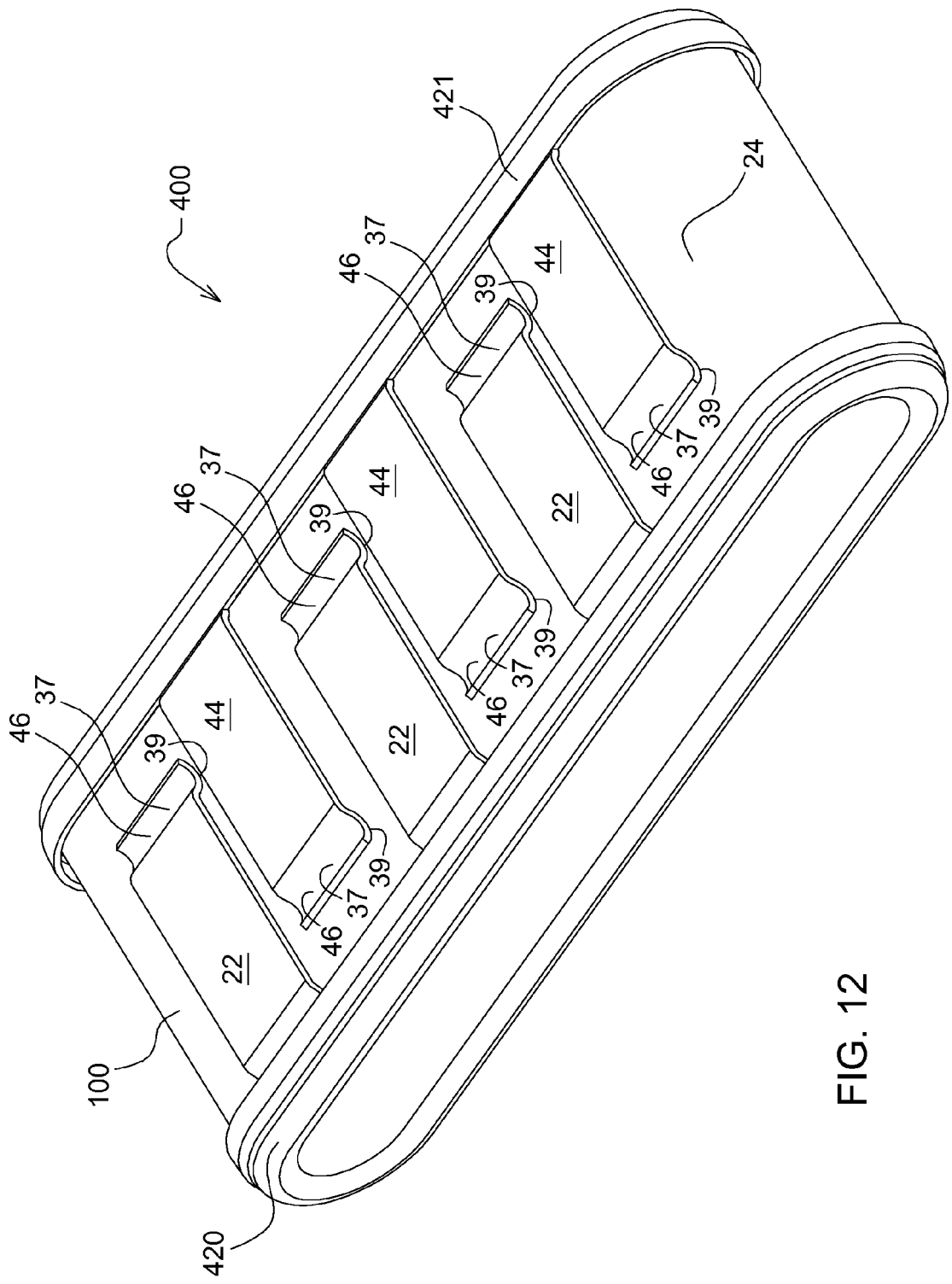
FIG. 12 is a perspective view of an alternate embodiment of a single capacitor.

FIG. 12 illustrates an alternate embodiment of a capacitor 400 that is similar to the capacitor 100 of FIG. 2, except the ends (420, 421) of capacitor 400 have no holes (e.g., 35). Ends (420, 421) are similar or identical to ends (20, 21), except that ends (420, 421) lack the holes 35 or openings illustrated in FIG. 2. Like reference numbers in FIG. 2 and FIG. 12 indicate like elements. For instance, the configuration of FIG. 12 does not require any holes to be filled, encapsulated, covered, dipped, injected or otherwise treated with a material to fill the hole or to protect the hole from the ingress of moisture, salt, fog, or contaminants into the capacitor 400.

In accordance with the disclosure, the capacitor and electronic assembly with the capacitor has a package that is potentially less costly, less time consuming to manufacture, lighter (e.g., lower in weight or mass), and smaller in size for a given value of capacitance (e.g., Farads) than conventional designs that require molding of filler, adhesive, polymer, plastic, elastomer or resin. The capacitor is well suited for active thermal management and heat dissipation, as described above in this disclosure.

The leads of the capacitor are also arranged for efficient thermal dissipation to ambient air, the enclosure 32 and the circuit board 28 via corresponding pads or conductive traces. Because one or more capacitors of the electronic assembly can be kept cooler, the electronic assembly (e.g., such as an inverter or controller) can operate reliably over a longer lifespan or have greater current or power handling capacity than otherwise possible. The lead frame facilitates a low resistance and low inductance electrical connection to the pads on the circuit board.

The capacitor and its lead frame supports dual-sided thermal management. With respect to thermal management of the first side of the capacitor, the capacitor lead frame attachment to the conductive pads offers great flexibility in thermal management by supporting various degrees of heat sinking into the circuit board 28. For example, lead frame of the capacitors disclosed herein can be attached electrically and mechanically connected to traces or conductive pads on the circuit boards at ends (e.g., 20, 21), or at tabs (e.g., 22, 44), or both, where each mechanical connection to the conductive pads provides thermal path to conduct, potentially, heat away from the capacitor. With respect to thermal management of the second side, opposite the circuit board 28, an optional respective thermal heat sink may overlie the capacitor for heat sinking.

Having described the preferred embodiment, it will become apparent that various modifications can be made without departing from the scope of the invention as defined in the accompanying claims.

The following is claimed:

1. A capacitor comprising:
a first winding member comprising a first conductive layer and first dielectric layer overlying the first conductive layer;
a second winding member comprising a second conductive layer and a second dielectric layer overlying the second conductive layer, the first winding member interleaved, partially or entirely, with the second winding layer;
a dielectric shell for radially surrounding the first winding member and the second winding member; and
the first winding member electrically connected to a first conductive end;
a second winding member electrically connected to a second conductive end, the second conductive end opposite the first conductive end, the first conductive end forming a first lead, the second conductive end forming a second lead, wherein the first conductive end has plurality of axially extending holes and wherein the second conductive end has a plurality of axial extending holes.

2. The capacitor according to claim 1 wherein the first conductive end has a peripheral mounting lip that extends inward toward the dielectric shell and wherein the second conductive end has a peripheral mounting lip that extends inward toward the dielectric shell.

3. The capacitor according to claim 1 wherein a plurality of first tabs extend at a substantially orthogonal angle from the first conductive end and wherein a plurality of second tabs extend at a substantially orthogonal angle from the second conductive end.

4. The capacitor according to claim 3 wherein the first tabs are interleaved with or adjacent to second tabs.

5. The capacitor according to claim 3 wherein each of the first tabs and the second tabs terminates in an arched portion, wherein the arch portion is biased against the dielectric shell.

6. The capacitor according to claim 5 wherein a greater radius of the arched portion faces inward toward the dielectric shell and a lesser radius of the arched portion faces outward.

7. A capacitor comprising:
a first winding member comprising a first conductive layer and first dielectric layer overlying the first conductive layer;

a second winding member comprising a second conductive layer and a second dielectric layer overlying the second conductive layer, the first winding member interleaved, partially or entirely, with the second winding layer;

a third winding member comprising a first conductive layer and first dielectric layer overlying the first conductive layer;

a fourth winding member comprising a second conductive layer and a second dielectric layer overlying the second conductive layer, the first winding member interleaved, partially or entirely, with the second winding layer;

a dielectric shell for radially surrounding the first winding member and the second winding member, a secondary dielectric shell for radially surrounding the third winding member, and the fourth winding member; and the first winding member and third winding member electrically connected to a first conductive end;

a second winding member and fourth winding member electrically connected to a second conductive end, the second conductive end opposite the first conductive end, the first conductive end forming a first lead, the second conductive end forming a second lead.

8. The capacitor according to claim 7 wherein the first conductive end has a peripheral mounting lip that extends inward toward the dielectric shell and wherein the second conductive end has a peripheral mounting lip that extends inward toward the dielectric shell.

9. The capacitor according to claim 7 wherein the first conductive end has plurality of axially extending holes and wherein the second conductive end has a plurality of axial extending holes.

10. The capacitor according to claim 7 wherein a plurality of first tabs extend at a substantially orthogonal angle from the first conductive end and wherein a plurality of second tabs extend at a substantially orthogonal angle from the second conductive end.

11. The capacitor according to claim 10 wherein the first tabs are interleaved with or adjacent to second tabs.

12. The capacitor according to claim 10 wherein each of the first tabs and the second tabs terminates in an arched portion, wherein the arch is biased against the dielectric shell.

13. The capacitor according to claim 12 wherein a greater radius of the arched portion faces inward toward the dielectric shell and a lesser radius of the arched portion faces outward.

14. An electronic assembly comprising:

a circuit board having a dielectric layer, conductive traces, and mounting pads associated with one or more conductive traces, a first winding member comprising a first conductive layer and first dielectric layer overlying the first conductive layer;

a second winding member comprising a second conductive layer and a second dielectric layer overlying the second conductive layer, the first winding member interleaved, partially or entirely, with the second winding layer;

a dielectric shell for radially surrounding the first winding member and the second winding member;

the first winding member electrically connected to a first conductive end;

a second winding member electrically connected to a second conductive end, the second conductive end opposite the first conductive end, the first conductive end forming a first lead, the second conductive end forming a second lead; and a portion of the first conductive end electrically and mechanically connected to a mounting pad via solder, wherein a plurality of first tabs extend at a substantially orthogonal angle from the first conductive end and wherein a plurality of second tabs extend at a substantially orthogonal angle from the second conductive end.

15. The electronic assembly according to claim 14 further comprising a portion of the second conductive end electrically and mechanically connected to another mounting pad via solder.

16. The electronic assembly according to claim 14 further comprising a portion of the second conductive end electrically and mechanically connected to an end of another capacitor.

17. The electronic assembly according to claim 14 wherein the first conductive end has a peripheral mounting lip that extends inward toward the dielectric shell and wherein the second conductive end has a peripheral mounting lip that extends inward toward the dielectric shell.

18. The electronic assembly according to claim 14 wherein the first conductive end has plurality of axially extending holes and wherein the second conductive end has a plurality of axial extending holes.

19. The electronic assembly according to claim 14 wherein the first tabs are interleaved with or adjacent to second tabs.

20. The electronic assembly according to claim 19 wherein each of the first tabs and the second tabs terminates in an arched portion, wherein the arch is biased against the dielectric shell.

21. The electronic assembly according to claim 20 wherein a greater radius of the arched portion faces inward toward the dielectric shell and a lesser radius of the arched portion faces outward.

22. The electronic assembly according to claim 19 wherein each of the first tabs is electrically and mechanically connected to a first inner conductive pad on the circuit board, and wherein each of the second tabs is electrically and mechanically connected to a second inner conductive pad on the circuit board; the first inner conductive pad and the second inner conductive pad forming a thermal pathway for sinking heat into the circuit board.

23. The electronic assembly according to claim 14 where a respective thermal heat sink overlies the capacitor for heat sinking and is on an opposite side of the capacitor with respect to the circuit board.

24. The electronic assembly according to claim 23 wherein the thermal heat sink comprises a first portion that mates with a second portion to form an interior that is populated with thermal dissipation members that are generally spaced apart from each other.

* * * * *